United States Patent
Helmick et al.

(10) Patent No.: US 12,474,854 B2
(45) Date of Patent: Nov. 18, 2025

(54) SYSTEMS, METHODS, AND APPARATUS FOR COPY DESTINATION ATOMICITY IN DEVICES

(71) Applicant: Samsung Electronics Co., Ltd., Suwon-si (KR)

(72) Inventors: Daniel Lee Helmick, Broomfield, CO (US); Rajesh Koul, San Jose, CA (US); Robert Wayne Moss, Fort Collins, CO (US); Sumanth Jannyavula Venkata, Pleasanton, CA (US); Young deok Kim, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/866,466

(22) Filed: Jul. 15, 2022

(65) Prior Publication Data
US 2023/0259294 A1 Aug. 17, 2023

Related U.S. Application Data

(60) Provisional application No. 63/309,508, filed on Feb. 11, 2022.

(51) Int. Cl.
*G06F 3/06* (2006.01)
(52) U.S. Cl.
CPC ............ *G06F 3/065* (2013.01); *G06F 3/0604* (2013.01); *G06F 3/0653* (2013.01); *G06F 3/0673* (2013.01)
(58) Field of Classification Search
None
See application file for complete search history.

(56) References Cited

U.S. PATENT DOCUMENTS

| | | | |
|---|---|---|---|
| 6,915,403 B2 | 7/2005 | Yamamoto et al. | |
| 8,078,813 B2 | 12/2011 | LeCrone et al. | |
| 8,095,827 B2 * | 1/2012 | Blea | G06F 11/1471 714/42 |
| 8,589,655 B2 | 11/2013 | Colgrove et al. | |
| 9,122,401 B2 | 9/2015 | Zaltsman et al. | |
| 9,298,507 B2 * | 3/2016 | Brown | G06F 11/1451 |
| 9,483,186 B1 | 11/2016 | Lewis et al. | |

(Continued)

OTHER PUBLICATIONS

European Extended Search Report for Application No. 23150922.5, mailed Jun. 20, 2023.

*Primary Examiner* — Elias Mamo
(74) *Attorney, Agent, or Firm* — Renaissance IP Law Group LLP

(57) ABSTRACT

A method may include receiving, at a device, a copy command, wherein the copy command comprises a first indication of a first amount of source data and a second indication of a second amount of source data, determining, based at least in part on the first indication, an amount of destination space, and blocking at least a portion of the amount of destination space. The method may further include reading the first indication, and reading the second indication, wherein the amount of destination space may include at least a first portion of the first amount and at least a second portion of the second amount. The blocking may include blocking the at least the first portion of the first amount and the at least the second portion of the second amount. The method may further include storing the first indication to generate a stored first indication.

20 Claims, 10 Drawing Sheets

(56) References Cited

U.S. PATENT DOCUMENTS

| | | |
|---|---|---|
| 9,558,232 B1 | 1/2017 | Taylor et al. |
| 9,563,555 B2* | 2/2017 | Flynn .................... G06F 3/0631 |
| 9,934,172 B1 | 4/2018 | Koli et al. |
| 10,353,588 B1 | 7/2019 | Koli et al. |
| 10,459,664 B1 | 10/2019 | Dreier et al. |
| 10,503,427 B2 | 12/2019 | Botes et al. |
| 10,521,139 B2 | 12/2019 | Gupta et al. |
| 10,564,847 B1* | 2/2020 | Taylor .................. G06F 3/0658 |
| 10,620,870 B2* | 4/2020 | Li ........................ G06F 12/0868 |
| 11,531,488 B2* | 12/2022 | Hutcheson, Jr. ..... G06F 11/3466 |
| 2004/0049649 A1 | 3/2004 | Durrant |
| 2006/0080507 A1 | 4/2006 | Tyndall et al. |
| 2007/0022319 A1* | 1/2007 | Haselton ............. G06F 11/1451 |
| | | 714/E11.123 |
| 2007/0038822 A1* | 2/2007 | Correl ................. G06F 11/1466 |
| | | 711/162 |
| 2007/0277015 A1* | 11/2007 | Kalos ................. G06F 11/1456 |
| | | 711/170 |
| 2017/0371597 A1 | 12/2017 | Jia et al. |
| 2018/0349037 A1 | 12/2018 | Zhao et al. |
| 2019/0034088 A1 | 1/2019 | Li et al. |
| 2021/0216569 A1 | 7/2021 | David et al. |
| 2022/0035530 A1 | 2/2022 | Singh |

\* cited by examiner

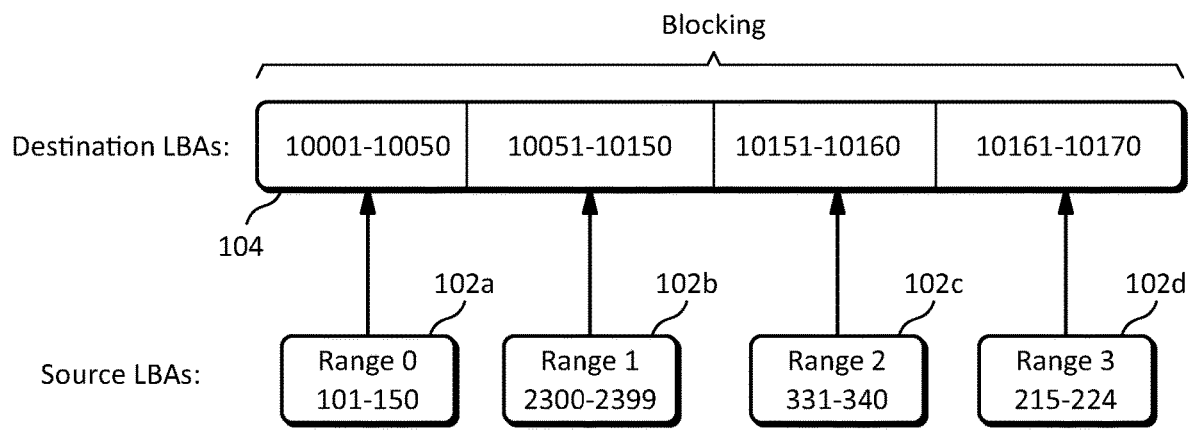
FIG. 1
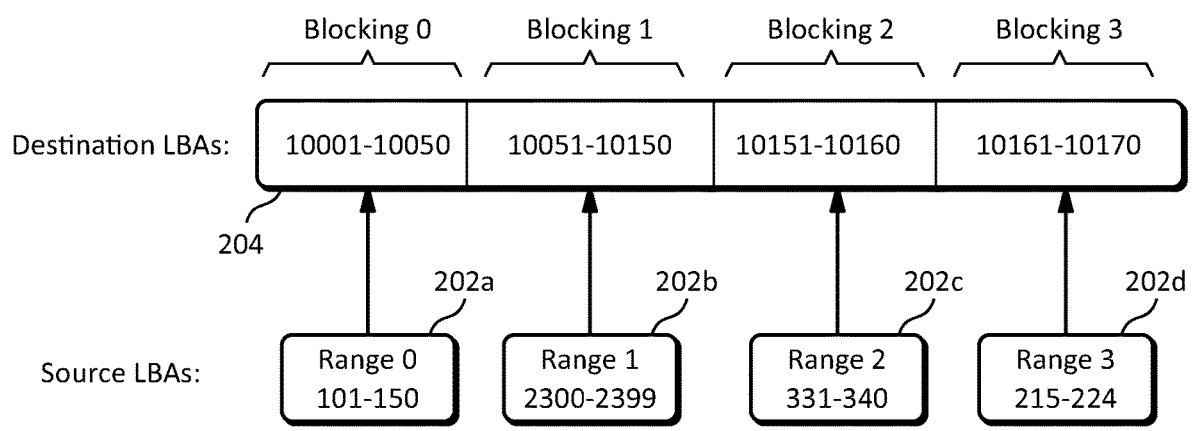
FIG. 2
| Example | Result | LBA 0 | LBA 1 | LBA 2 | LBA 3 | LBA 4 |
|---|---|---|---|---|---|---|
| 1 | Valid | A | A | A | A | B |
| 2 | Valid | A | B | B | B | B |
| 3 | Invalid | A | A | B | B | B |
| 4 | Invalid | A | B | A | A | A |
FIG. 3

SYSTEMS, METHODS, AND APPARATUS FOR COPY DESTINATION ATOMICITY IN DEVICES

REFERENCE TO RELATED APPLICATION

This application claims priority to, and the benefit of, U.S. Provisional Patent Application Ser. No. 63/309,508 filed Feb. 11, 2022 which is incorporated by reference.

TECHNICAL FIELD

This disclosure relates generally to storage devices, and more specifically to systems, methods, and apparatus for copy destination atomicity in devices.

BACKGROUND

A storage device may implement a copy operation in which data from one or more source address ranges may be copied to a destination address range. A copy operation may be used, for example, for a host directed garbage collection operation in which data from multiple source address ranges may be moved to a destination address range.

The above information disclosed in this Background section is only for enhancement of understanding of the background of the inventive principles and therefore it may contain information that does not constitute prior art.

SUMMARY

A method may include receiving, at a device, a copy command, wherein the copy command comprises a first indication of a first amount of source data and a second indication of a second amount of source data, determining, based at least in part on the first indication, an amount of destination space, and blocking at least a portion of the amount of destination space. The method may further include reading the first indication, and reading the second indication, wherein the amount of destination space may include at least a first portion of the first amount and at least a second portion of the second amount. The blocking may include blocking the at least the first portion of the first amount and the at least the second portion of the second amount. The method may further include storing the first indication to generate a stored first indication. The method may further include reading the stored first indication, and writing, based on the reading the stored first indication, in the at least a portion of the amount of destination space, at least a portion of the first amount of source data. The stored first indication may be stored in a first memory location, the method may further include modifying, based on the writing the at least a portion of the first amount of data, the first memory location. The reading the first indication may include performing a first read operation of the first indication, the method may further include performing a second read operation of the first indication, and writing, based on the second read operation, in the at least a portion of the amount of destination space, at least a portion of the first amount of source data. The method may further include storing the second indication to generate a stored second indication, reading the stored second indication, and writing, based on the reading the stored second indication, in the at least a portion of the amount of destination space, at least a portion of the second amount of source data. The amount of destination space may be a first amount of destination space, the method may further include blocking, based on the receiving the copy command, a second amount of destination space. The second amount of destination space may be based on a copy length for the copy command. The determining the first amount of destination space may include modifying the second amount of destination space based at least in part on the first indication. The copy command may include a count of indications, and the determining the first amount of destination space may be based on the count of indications. The amount of destination space may be a first amount of destination space, the method may further include determining, based at least in part on the second indication, a second amount of destination space, and blocking, at least a portion of the second amount of destination space.

A system may include a host configured to send a copy command, wherein the copy command may include a first indication of a first amount of source data and a second indication of a second amount of source data, and a device configured to receive the copy command, determine, based at least in part on the first indication, an amount of destination space, and block at least a portion of the amount of destination space. The device may be further configured to read, from the host, the first indication, and read, from the host, the second indication, wherein the amount of destination space may include at least a first portion of the first amount and at least a second portion of the second amount. The device may be further configured to store, at the device, the first indication to generate a stored first indication, perform a read operation of the stored first indication, and write, based on the read operation, in the at least a portion of the amount of destination space, at least a portion of the first amount of source data.

A device may include a communication interface, a storage medium, and a device controller configured to receive, using the communication interface, a copy command, wherein the copy command may include a first indication of a first amount of source data in the storage medium and a second indication of a second amount of source data in the storage medium, determine, based at least in part on the first indication, an amount of destination space in the storage medium, and block at least a portion of the amount of destination space. The device controller may be configured to perform a first read operation of the first indication using the communication interface, and perform a second read operation of the second indication using the communication interface, wherein the amount of destination space may include at least a first portion of the first amount and at least a second portion of the second amount. The device controller may be configured to store the first indication to generate a stored first indication, perform a read operation of the stored first indication, and write, based on the read operation, in the at least a portion of the amount of destination space, at least a portion of the first amount of source data. The device controller may be configured to perform a third read operation of the first indication using the communication interface, and write, based on the third read operation, in the at least a portion of the amount of destination space, at least a portion of the first amount of source data.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

FIG. 1 illustrates a first embodiment of a copy operation accordance with example embodiments of the disclosure.

FIG. 2 illustrates a second embodiment of a copy operation in accordance with example embodiments of the disclosure.

FIG. 3 Illustrates a table of example embodiments of copy command results in accordance with example embodiments of the disclosure.

DETAILED DESCRIPTION

Figure 4:
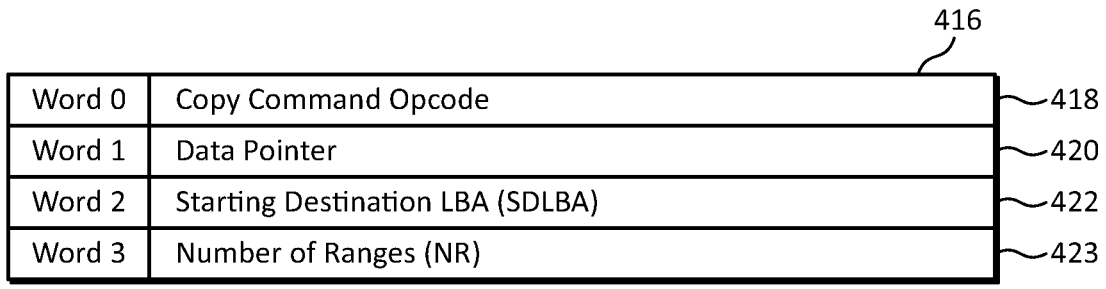
FIG. 4 illustrates an example embodiment of a command format for a copy command in accordance with example embodiments of the disclosure.

A device may implement a copy command that may involve performing one or more read operations to read data from one or more source address ranges and performing one or more write operations to write some or all of the data to one or more destination address ranges. For example, a copy command may enable a user to indicate multiple source address ranges (e.g., in a storage media in a storage device) from which data may be read, and a contiguous destination address range into which some or all of the data may be written.

Some copy commands may enable some or all of one or more destination address ranges to be blocked, for example, to enable the copy command to perform one or more atomic write operations on the one or more destination address ranges. However, in some situations (e.g., if the copy command indicates more than one source address range), a device may not know how much of the one or more destination address ranges to block.

Some of the inventive principles of this disclosure relate to various techniques for determining one or more amounts of destination space to block for a write operation of a copy command. For example, in some embodiments, a copy command may include a first indication of a first amount of source data and a second indication of a second amount of source data. A device may combine the first amount of source data and the second amount of source data to determine a total amount of destination space to block for the copy command. As another example, a device may block, at least initially, an amount of destination space based on a maximum copy length for a copy command.

Some additional inventive principles of this disclosure relate to various techniques for executing a copy command that may involve blocking at least some portions of one or more destination address ranges. For example, in some embodiments, a device may read one or more indications of one or more amounts of source data to determine a total amount of destination space to block for the copy command. The device may store at least one of the indications at the device, for example, to use in performing one or more read operations and/or write operations as part of the copy command execution.

As another example, in some embodiments, a device may perform one or more first read operations of one or more indications of one or more amounts of source data to determine a total amount of destination space to block for the copy command. The device may perform one or more second read operations of the one or more indications of one or more amounts of source data to use in performing one or more read operations and/or write operations as part of the copy command execution.

As a further example, a device may initially block an amount of destination space based on a maximum copy length for a copy command. Based on performing one or more read operations and/or write operations for the copy command, the device may modify the amount of destination space that is blocked, for example, based on a number of remaining read and/or write operations for the copy command.

This disclosure encompasses numerous inventive principles relating to determining and/or blocking destination space for copy commands. The principles disclosed herein may have independent utility and may be embodied individually, and not every embodiment may utilize every principle. Moreover, the principles may also be embodied in various combinations, some of which may amplify some benefits of the individual principles in a synergistic manner. For example, some embodiments may store one or more indications of one or more amounts of source data for a first number of copy commands and may perform first and second read operations of one or more indications of one or more amounts of source data for subsequent copy commands.

For purposes of illustration, some example embodiments may be described in the context of some example implementation details such as a storage device that may implement a copy command (e.g., a simple copy command) received using a storage protocol such as Nonvolatile Memory Express (NVMe) and operating on storage media that may be accessed by logical block addresses (LBAs). However, the inventive principles are not limited to these example implementation details and may be applied to any type of device (e.g., an accelerator, a graphics processing unit (GPU), a neural processing unit (NPU), and/or the like, implementing any type of copy command using any type of protocol and/or interface (e.g., Serial ATA (SATA), Small Computer Systems Interface (SCSI), Serial Attached SCSI (SAS)), any type of addressable data (e.g., registers, memory, storage media, and/or the like) arranged in any manner, and/or the like. In some embodiments, the inventive principles may be implemented using a storage protocol that may enable overlapping command execution enabling parallelization (e.g., maximum parallelization) of overlapping commands, of which NVMe is an example. In some embodiments, the use of one or more atomic operations may enable overlapping commands to be ordered and/or definitive under some circumstances.

FIG. 1 illustrates a first embodiment of a copy operation in accordance with example embodiments of the disclosure. In the embodiment illustrated in FIG. 1, a copy command may provide four source indications 102a, 102d of four amounts of source data, although any number of indications and/or amounts of source data may be used. In this example, the source indications 102a, . . . , 102d may be provided in the form of source ranges of LBAs in a storage device (e.g., a solid state drive (SSD)) which may indicate an amount of source data based on an LBA size. (For example, a system may use an LBA size of 512 bytes or any other size.) Alternatively, or additionally, an indication of an amount of source data may be implemented with any one or more indicia such as a number of logic blocks (NLB), a number and/or size of buffers, a number of bytes, a number of pages, and/or the like.

The first indication 102a may specify a first source LBA range (Range 0), which in this example may be LBA range 101-150 (e.g., 50 LBAs). The source LBA range may be specified in any suitable manner, for example, by specifying a starting source LBA (SSLBA) and an ending source LBA (ESLBA) as shown in Hg. 1, by specifying a starting source LBA and a number of LBAs (e.g., an NLB), and/or in any other manner.

The second indication 102b may specify a second source LBA range (Range 1), which in this example may be LBA range 2300-2399 (e.g., 100 LBAs). The third indication 102c may specify a third source LBA range (Range 2), which in this example may be LBA range 331-340 (e.g., 10 LBAs). The fourth indication 102d may specify a fourth source LBA range (Range 3), which in this example may be LBA range 215-224 (e.g., 10 LBAs).

The copy command may further include an indication 104 that may specify a contiguous destination LBA range, which in this example, may be LBA range 10001-10170 (e.g., 170 LBAs). The destination LBA range may be specified in any suitable manner, for example, by specifying a starting destination LBA (SDLBA) and an ending destination LBA (EDLBA) as shown in FIG. 1, by specifying a starting destination LBA and a total number of destination LBAs, and/or in any other manner. In some embodiments, a total number of destination LBAs may be determined, for example, by summing the number of LBAs (NLBs) for some or all (e.g., each) of the four source LBA ranges (e.g., Range 0 through Range 3).

In the example embodiment illustrated in FIG. 1, some or all of the destination LBA range 10001-10170 may be blocked based on a first aspect (e.g., a characteristic, parameter, event, action, condition, indication, determination, and/or the like) of a copy command, and some or all of the block may be released based on a second aspect of the copy command. For example, in some embodiments, the entire destination LBA range 10001-10170 may be blocked during some or all of an execution of the copy command, e.g., to preserve atomicity over the entire destination LBA range. In some embodiments, blocking may refer to enforcing ordering of commands (e.g. other reads, other writes, other copy commands, and/or the like), subcommands (e.g. executing one or more portions of a copy command and/or write operation such as managing data buffered in a storage device controller), source range operations, destination range operations, and/or the like, during some or all of the copy operation (e.g., execution of the copy command).

Thus, for example, blocking of the destination LBA range 10001-10170 and/or the source LBA ranges (e.g., Range 0 through Range 3) may be enforced during a first read operation to read first source data from Range 0, a first write operation to write the first source data to destination LBA range 10001-10050, a second read operation to read second source data from Range 1, a second write operation to write the second source data to destination LBA range 10051-10150, a third read operation to read third source data from Range 2, a third write operation to write the third source data to destination LBA range 10151-10160, a fourth read operation to read fourth source data from Range 3, and a fourth write operation to write the fourth source data to destination LBA range 10161-10170. Additionally, or alternatively, one or more source range entries (SREs) as described below may be read in portions. For example, some embodiments, in the event of a power failure, may attempt to execute one or more copy commands and/or write operations with data in units in multiples of an atomic write power failure parameter (e.g., an Atomic Write Unit Power Fail (AWUPF) parameter). In such an embodiment, a copy command and/or write operation may stop at a boundary of an atomic write power failure parameter. Thus, in such an embodiment, an SRE may be executed in one or more portions. Additionally, or alternatively, in some embodiments, an ending segment of a first SRE may be executed simultaneously, concurrently, overlapping, and/or the like, with a beginning segment of a second SRE. In some embodiments, and depending on the implementation details, the first and second SREs may be consecutive and/or nonconsecutive SREs.

FIG. 2 illustrates a second embodiment of a copy operation in accordance with example embodiments of the disclosure. In some aspects, the embodiment illustrated in FIG. 2 may be similar to that illustrated in FIG. 1, and elements in FIG. 2 that are similar to those in FIG. 1 may be indicated by reference numerals ending in the same digits. However, in the embodiment illustrated in FIG. 2, blocking may be enforced on the basis of individual read and/or write operations for individual source and/or destination LBA ranges.

Thus, for example, blocking of the first destination LBA range 10001-10050 (Blocking 0) and/or the first source LBA range (which may be referred to as Range 0) may be enforced during a first read operation to read first source data from Range 0 and/or a first write operation to write the first source data to destination LBA range 10001-10050. Blocking of the second destination LBA range 10051-10150 (Blocking 1) and/or the second source LBA range (which may be referred to as Range 1) may be enforced during a second read operation to read second source data from Range 1 and/or a second write operation to write the second source data to destination LBA range 10051-10150. Blocking of the third destination LBA range 10151-10160 (Blocking 2) and/or the third source LBA range (which may be referred to as Range 2) may be enforced during a third read operation to read third source data from Range 2 and/or a third write operation to write the third source data to destination LBA range 10151-10160, Blocking of the fourth destination LBA range 10161-10170 (Blocking 3) and/or the fourth source LBA range (which may be referred to as Range 3) may be enforced during a fourth read operation to read fourth source data from Range 3, and/or a fourth write operation to write the fourth source data to destination LBA range 10161-10170. Alternatively, or additionally, in some embodiments, multiple destination LBA ranges (e.g., two or more of Range 0, Range 1, Range 2, and/or Range 3) may be blocked initially, and a block on one or more of the destination LBAs may be released, for example, one at a time as a write operation for the corresponding LBA range is completed.

FIG. 3 Illustrates a table of example embodiments of copy command results in accordance with example embodiments of the disclosure. The embodiments illustrated in FIG. 3 may demonstrate, for example, results that may be obtained using the different blocking techniques illustrated in FIG. 1 and/or FIG. 2. In the embodiments illustrated in FIG. 3, a first command (which may be referred to as Copy Command A) and a second copy command (which may be referred to as Copy Command B) may be present in a storage device (e.g., in a controller in a storage device). In some embodiments, Copy Command A and Copy Command B may have been read from a submission queue (SQ) as described below, for example, with respect to FIG. 12. In such an embodiment, for the examples illustrated in FIG. 3, Copy Command A and Copy Command B may have not yet returned corresponding completion queue (CQ) entries as described below, for example, with respect to FIGS. 6-11.

In some embodiments, blocking relating to atomicity may affect one or more other input and/or output operations and/or commands (I/O operations, I/O commands, or I/O) such as write and/or read commands. For example, in some embodiments, and depending on the implementation details, blocking relating to one or more copy commands, write commands, read commands, write operations, read operations, and/or the like, may result in a delay in one or more portions of another copy command, write command, read command, write operation, read operation, and/or the like, for one or more overlapping LBA ranges.

In the table 306 illustrated in FIG. 3, a first copy command (Command A) may write data from one or more source LBA ranges to four contiguous destination LBAs (LBA0 through LBA3), and a second copy command (Command B) may write data from one or more source LBA ranges to four contiguous destination LBAs (LBA1 through LBA4). However, depending on the order of the execution of Command A and Command B and/or the type of blocking implemented, different results may be obtained.

Referring to FIG. 3, the rows 308 and 310 illustrating Example 1 and Example 2, respectively, show the results that may be obtained when Command A and Command B both implement blocking over an entire combined destination LBA range (as implemented, for example, in the embodiment illustrated in FIG. 1) or a single destination LBA range (as implemented, for example, in the embodiment illustrated in FIG. 2).

In Example 1 illustrated in row 308, Command B may be executed first followed by Command A, Because blocking may be enforced over the entire destination LBA range for Command B until Command B is completed, Command A may not proceed to overwrite the results for Command B until Command B is completed. Thus, valid results for Command A (indicted by data "A" shown in LBA0 through LBA3) may be obtained.

In Example 2 illustrated in row 310, Command A may be executed first followed by Command B. Because blocking may be enforced over the entire destination LBA range for Command A until Command A is completed, Command B may not proceed to overwrite the results for Command A until Command A is completed. Thus, valid results for Command B (indicted by data "B" shown in LBA1 through LBA4) may be obtained.

In contrast, the rows 312 and 314 illustrating Example 3 and Example 4, respectively, show the results that may be obtained when Command A and Command B do not implement blocking over combined or individual destination LBA ranges. Regardless of the order of execution of Command A and Command B, because blocking may only be enforced over individual destination LBA ranges (e.g., associated with individual source LBA ranges), invalid results may be obtained (indicated, for example, by instances of data "B" for command B located in LBA 2 and LBA 3 in row 312 for Example 3, and instances of data "A" for command A located in LBA 2 and LBA 3 in row 314 for Example 4).

For purposes of illustrating the inventive principles, the embodiments illustrated in FIG. 1, FIG. 2, and FIG. 3 are describe in the context of a system that may implement destination range (DR) atomicity. The principles, however, may be applied to systems that may implement any other types of atomicity. For example, some embodiments may implement source range entry (SRE) atomicity, or a combination of DR atomicity and SRE atomicity.

In some embodiments, writing data to one or more destination LBAs may refer to programming data into a storage media such as Not-AND (NAND) flash memory. Alternatively, or additionally, writing data to one or more destination LBAs may refer to updating a write buffer with write data which may also involve updating some or all tracking information associated with the write data (e.g., in a controller for a storage device and/or in storage media in the storage device). In some embodiments, writing data may refer a write operation in which data in a buffer may not be fully programmed into storage media, but one or more read commands that my access one or more LBAs associated with the write operation may return data as shown in the table illustrated in FIG. 3, for example, by returning a portion of the data from the write buffer and/or returning a portion of the data from the programmed storage media. Depending on the implementation details, this may enable a block or ordering constraint for one or more LBAs associated with data in a write buffer to be released before the data in the write buffer is programmed into the storage media.

FIG. 4 illustrates an example embodiment of a command format for a copy command in accordance with example embodiments of the disclosure. The copy command 416 illustrated in FIG. 4 may include a first word (Word 0) having an opcode 418 to indicate that the command is a copy command, and a second word (Word 1) having a data pointer 420 which may point to a data (e.g., memory) location that may contain data (e.g., data such as the source range entries (SREs) illustrated in FIG. 5) to use with the copy command 416. The copy command 416 may further include a third word (Word 2) having an SDLBA that may indicate the first LBA to be used as a destination for one or more write operations using data read from one or more source LBAs. The copy command 416 may further include a fourth word (Word 3) having a number of ranges (NR) that may indicate a number of SREs that may provide information on the location, amount, and/or the like, of data to use for one or more read operations of the copy command. In some embodiments, the copy command 416 illustrated FIG. 4 may be referred to as a Submission Queue Entry (SQE) and may include one or more additional words, fields, and/or the like relating to features such as retries, protection information, directive types, reference tags, one or more formats for data used with the copy command 416 (e.g., one or more formats for the SREs such as those illustrated in FIG. 5), and/or the like.

Figure 5:
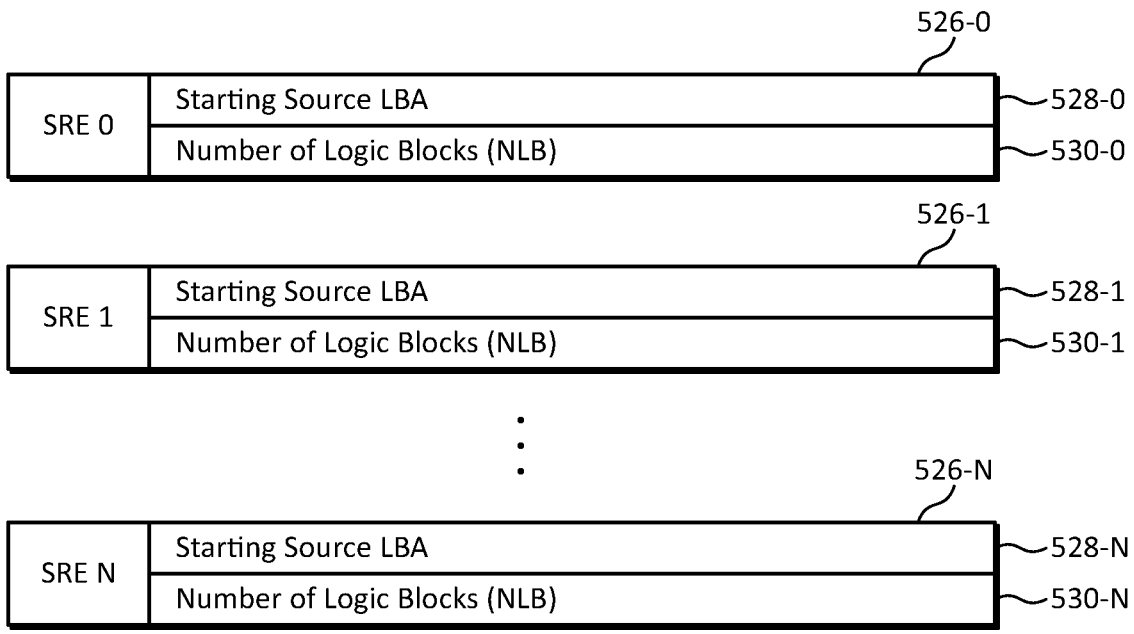
FIG. 5 illustrates an example embodiment of a data format for data that may be used with a copy command in accordance with example embodiments of the disclosure.

FIG. 5 illustrates an example embodiment of a data format for data that may be used with a copy command in accordance with example embodiments of the disclosure. The data structure illustrated in FIG. 5 may be used, for example, with the embodiment of a copy command illustrated in FIG. 4.

Referring to FIG. 5, the data structure may include one or more SREs 526-0, 526-1, . . . , 526-N. One or more of the SREs 526-0, 526-1, . . . , 526-N may include a corresponding starting source LBA (SSLBA) 528-0, 5281, . . . , 528-N and/or one or more corresponding number of logical blocks (NLB) 530-0, 530-1, . . . , 530-N. Thus, in the example embodiment illustrated in FIG. 5, an indication of an amount of source data may be provided in the form of an NLB.

In some embodiments, the information provided in the copy command 416 illustrated in FIG. 4 and/or the one or more SREs 526-0, 526-1, . . . , 526-N illustrated in FIG. 5 may provide a device receiving the copy command 416 enough information to implement the copy command 416.

However, in embodiments that may implement blocking of one or more destination spaces (e.g., blocking of one or more portions of one or more destination LBAs to implement atomic operations), it may be difficult to determine one or more destination spaces on which to implement blocking. For example, blocking an entire destination LBA range (as implemented, for example, in the embodiment illustrated in FIG. 1) may involve reading multiple (e.g., all) of the SREs 526-0, 526-1, . . . , 526-N illustrated in FIG. 5 and adding some (e.g., all) of the NLBs 530-0, 530-1, . . . , 530-N to determine a total NLB for the copy command. In some embodiments, this blocking operation may use the SDLBA illustrated in FIG. 4 and/or it may use the total NLB for the copy command as calculated from the individual SREs.

Figure 6:
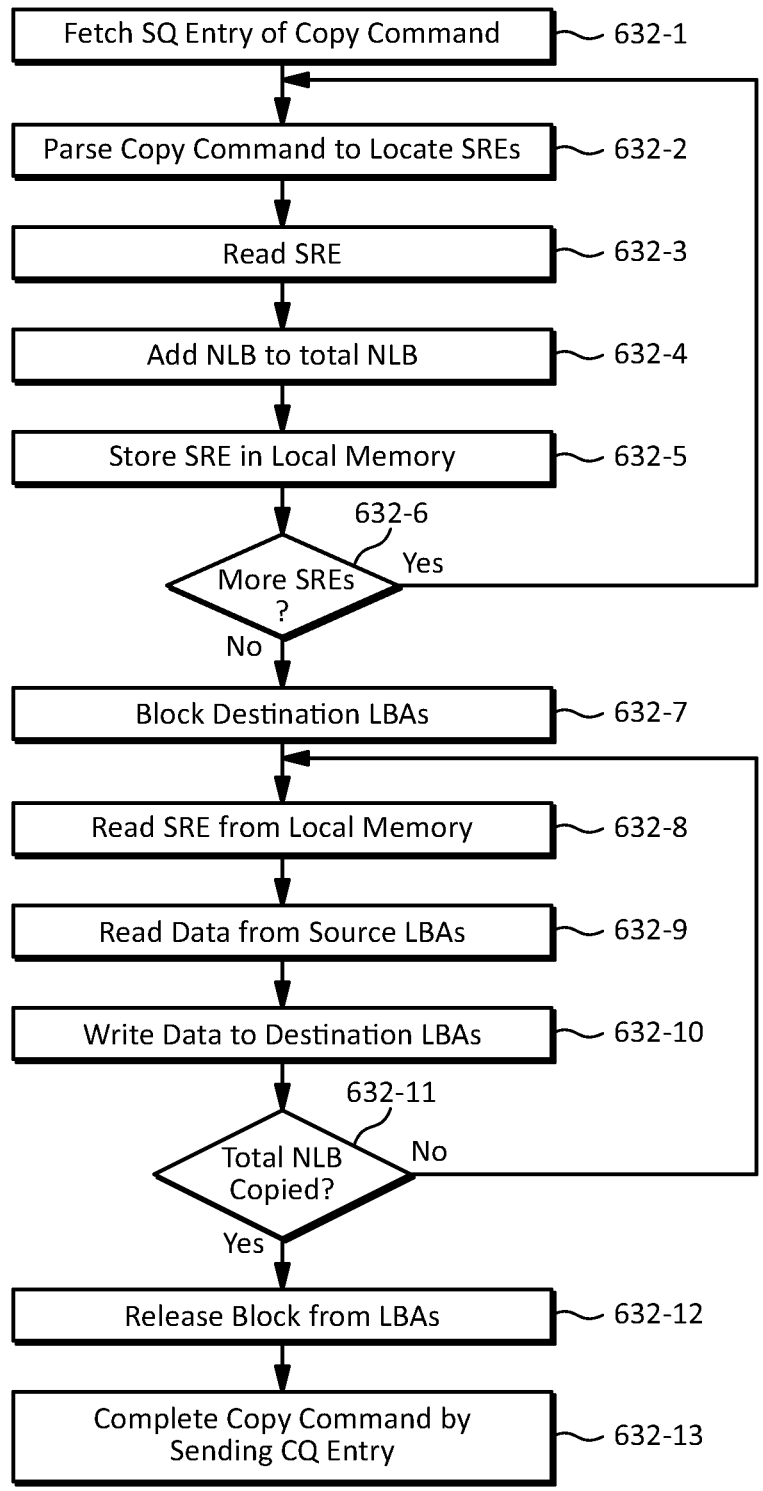
FIG. 6 illustrates an embodiment of a method for a copy operation with storage of source range entries in accordance with example embodiments of the disclosure.

FIG. 6 illustrates an embodiment of a method for a copy operation with storage of source range entries in accordance with example embodiments of the disclosure. For purposes of illustration, the embodiment illustrated in FIG. 6 may be described in the context of a device such as a storage device that may receive a copy command using a storage protocol such as NVMe, but the inventive principles are not limited to these example implementation details. For example, some embodiments may use Serial ATA (SATA), Small Computer Systems Interface (SCSI), Serial Attached SCSI (SAS), and/or any other type of interface, protocol, and/or the like with any type of device.

Referring to FIG. 6, the method may begin at operation 632-1 wherein a device may fetch a submission queue (SQ) entry with a copy command. In some embodiments, the submission queue (SQ) may reside at a host, at the device, or at any other location. At operation 632-2, the method may parse the copy command (e.g., by checking the number of ranges (NR) as in Word 3 illustrated in FIG. 4) to locate one or more source range entries (SREs), for example, as illustrated in FIG. 5 to locate an SDLBA field, and/or the like. Also at operation 632-2, the method may initialize a total number of logic blocks (total NLB) to zero. In some embodiments, the SREs may be located, for example, in memory at a host, at the device, or at any other location.

At operation 632-3, the method may read an SRE from a data region (e.g., a data region pointed to by a data pointer such as Word 01 illustrated in FIG. 4) which, in this example, may be located at a host. At operation 632-4, the method may add the NLB in the SRE to the total NLB. At operation 632-5, the method may store the SRE, for example, in local memory of the device. At operation 632-6, the method may determine if there are any additional SREs to read (e.g., based on the NR). If there are additional SREs to read, the method may continue looping through operations 632-3, 632-4, and/or 632-5 until all of the SREs (e.g., indicated by the number of ranges in Word 3) have been read and the corresponding NLBs have been added to the total NLB. Thus, in some embodiments, and depending on the implementation details, the total NLB may indicate the total number of LBAs indicated by the sum of the individual SREs indicated by the copy command.

At operation 632-7, the method may block at least a portion (e.g., all) of the destination LBAs (e.g., beginning at the SDLBA 422 and continuing for an amount of destination LBAs determined by the total NLB), for example, to enforce command and/or SRE ordering for one or more atomicity specifications of the copy command.

Once some or all of the destination LBAs have been blocked, the method may begin performing one or more read operations and/or one or more write operations to copy data indicated by one or more SREs to one or more destination LBAs. For example, at operation 632-8, the method may retrieve an SRE (which may have been stored in local memory, e.g., at operation 632-5). At operation 632-9, the method may perform a read operation on source data indicated by the corresponding starting source LBA and NLB of the retrieved SRE. At operation 632-10, the method may perform a write operation by writing the data read at operation 632-9 into one or more corresponding destination LBAs.

At operation 632-11, the method may determine if the total amount of source data indicated by the total NLB has been read from the corresponding source LBAs and written to the destination LBAs indicted by the SDLBA and total NLB. If source data associated with one or more SREs remains to be read and/or written, the method may loop through operations 632-8, 632-9, 632-10, and/or 632-11 until the source data associated with the SREs has been read and written to the corresponding destination LBAs. At operation 632-12, the method may release the block from some or all of the destination LBAs that may have been blocked in operation 632-7. At operation 632-13, the method complete the copy command, for example, by sending a completion queue (CQ) entry to a host to indicate that the copy command has been completed. In some embodiments, the release of the block can be in full or partial. For example, the block may be released on a portion of copy operations that have completed some progress of reading or writing.

Although operations 632-8, 632-9, and/or 632-10 may show the copy command progressing sequentially through SREs, in some embodiments, one or more read and/or write operations used to implement the copy command may be performed in parallel, for example, while still maintaining atomicity of the overall copy command.

In some embodiments, and depending on the implementation details, an embodiment of a copy operation as illustrated in FIG. 6 may access SREs (e.g., in local memory of a storage device) for any purpose and/or in any ordering with little or no penalty, for example, in terms of access time, power consumption, latency, and/or the like.

Figure 7:
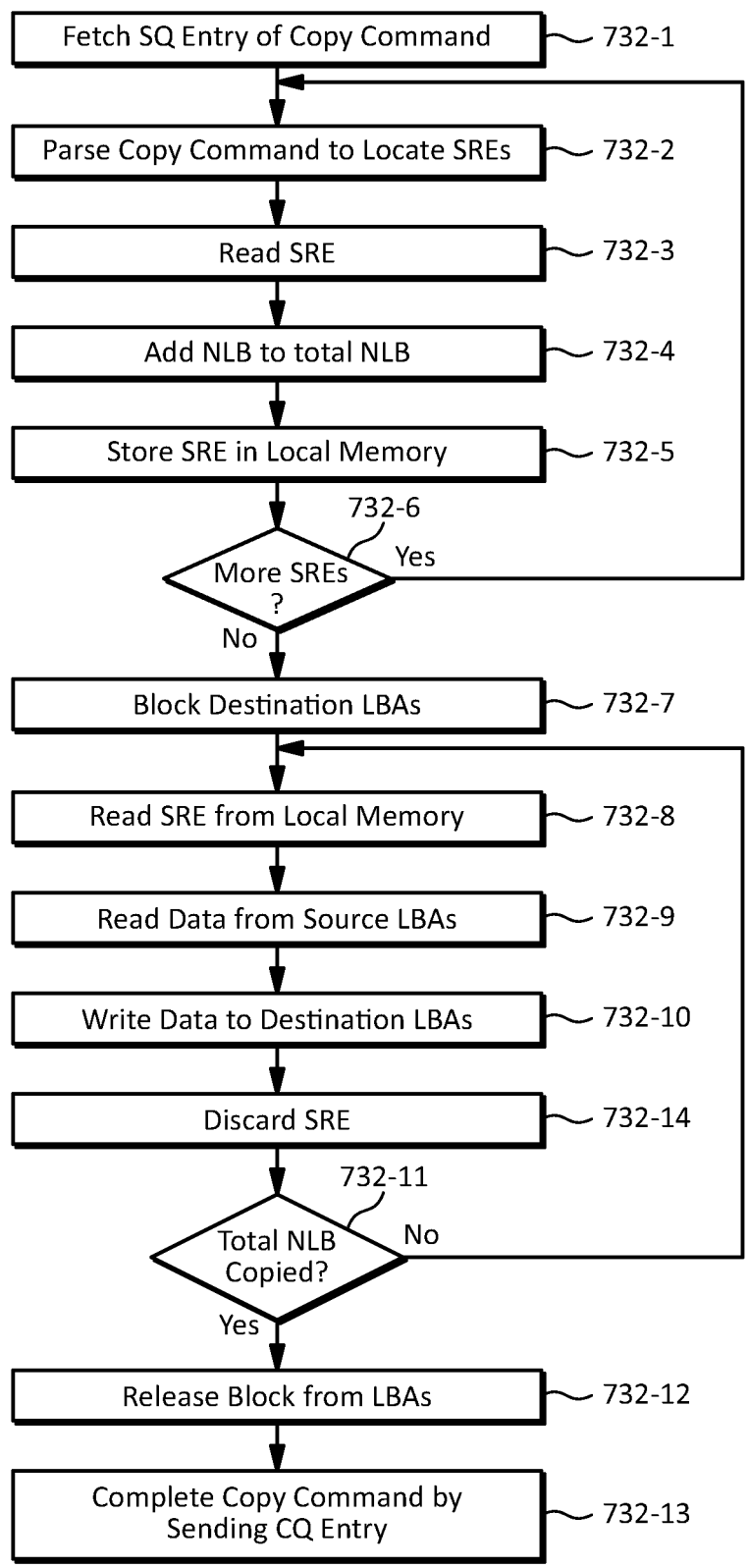
FIG. 7 illustrates another embodiment of a method for a copy operation with storage of source range entries in accordance with example embodiments of the disclosure.

FIG. 7 illustrates another embodiment of a method for a copy operation with storage of source range entries in accordance with example embodiments of the disclosure. In some aspects, the embodiment illustrated in FIG. 7 may be similar to the embodiment illustrated in FIG. 6, and elements in FIG. 7 that are similar to those in FIG. 6 may be indicated by reference numerals ending in the same digits. However, the embodiment illustrated in FIG. 7 may include an operation 732-14 in which the method may discard one or more SREs, for example, after the source data indicated by the SRE is read from one or more corresponding source LBAs and/or written to one or more corresponding destination LBAs. For example, in some embodiments, an SRE may be discarded by freeing the space it may occupy in local memory for use by one or more other processes. Depending on the implementation details, this may improve and/or optimize the method illustrated in FIG. 7.

Figure 8:
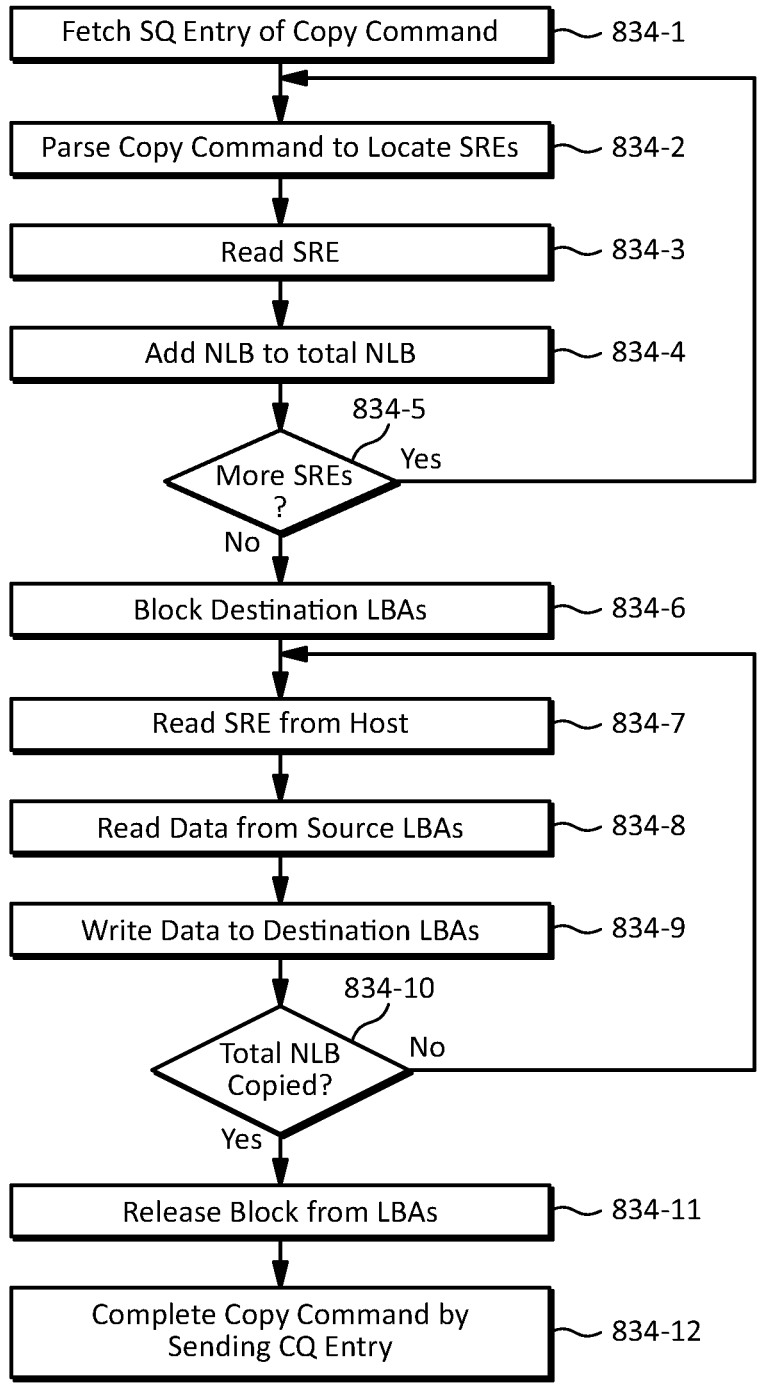
FIG. 8 illustrates an embodiment of a method for a copy operation with first and second reads of source range entries in accordance with example embodiments of the disclosure.

FIG. 8 illustrates an embodiment of a method for a copy operation with first and second reads of source range entries in accordance with example embodiments of the disclosure. For purposes of illustration, the embodiment illustrated in FIG. 8 may be described in the context of a device such as a storage device that may receive a copy command using a storage protocol such as NVMe, but the inventive principles are not limited to these example implementation details. For example, some embodiments may use SATA, SAS, and/or any other type of interface, protocol, and/or the like with any type of device.

Referring to FIG. 8, the method may begin at operation 834-1 wherein a device may fetch a submission queue entry with a copy command. In some embodiments, the submission queue may reside at a host, at the device, or at any other location. At operation 834-2, the method may parse the copy command (e.g., by checking the number of ranges as in Word 3 illustrated in FIG. 4) to locate one or more SREs, for example, as illustrated in FIG. 5 to locate an SDLBA field, and/or the like. Also at operation 834-2, the method may initialize a total NLB for the copy command to zero. In some embodiments, the SREs may be located, for example, in memory at a host, at the device, or at any other location.

At operation 834-3, the method may read an SRE from a data region (e.g., a data region pointed to by a data pointer such as Word 1 illustrated in FIG. 4) which, in this example, may be located at a host. At operation 834-4, the method may add the NLB in the SRE to the total NLB.

At operation 834-5, the method may determine if there are any additional SREs to read. If there are additional SREs to read, the method may continue looping through operations 834-2, 834-3, and 834-4 until all of the SREs (e.g., indicated by the number of ranges in Word 3) have been read and the corresponding NLBs have been added to the total NLB. Thus, in some embodiments, and depending on the implementation details, the total NLB may indicate the total number of LBAs indicated by the of SREs indicated by the copy command.

In the embodiment illustrated in FIG. 8, the method may not store one or more of the SREs locally at the device. Thus, depending on the implementation details, the embodiment illustrated in FIG. 8 may reduce the amount of local memory used by a device. For example, in some embodiments, an SRE may use 32 bytes of memory, and a copy command may include up to 256 SREs. Thus, depending on the implementation details, the embodiment illustrated in FIG. 8 may reduce local memory usage by about 8 KiB per copy command.

At operation 834-6, the method may block at least a portion (e.g., all) of the destination LBAs (e.g., beginning at the SDLBA and continuing for an amount of destination LBAs determined by the total NLB), for example, to enforce command and/or SRE ordering for one or more atomicity specifications of the copy command.

Once some or all of the destination LBAs have been blocked, the method may begin reading one or more SREs a second time to perform one or more read operations and/or one or more write operations to implement the copy command. For example, at operation 834-7, the method may read, for the second time, an SRE (which in this example may be located at a host). At operation 834-8, the method may perform a read operation on source data indicated by the corresponding starting source LBA and NLB of the SRE which has been read from the host a second time. At operation 834-9, the method may perform a write operation by writing the data read at operation 834-8 into one or more corresponding destination LBAs.

At operation 834-10, the method may determine if the total amount of source data indicated by the total NLB has been read from the corresponding source LBAs and written to the destination LBAs indicted by the SDLBA and total NLB. If source data associated with one or more SREs remains to be read and/or written, the method may loop through operations 834-7, 834-8, 834-9, and/or 834-10 until the source data associated with the SREs has been read and written to the corresponding destination LBAs. At operation 834-11, the method may release the block from some or all of the destination LBAs that may have been blocked in operation 834-6. At operation 834-12, the method complete the copy command, for example, by sending a completion queue entry to a host to indicate that the copy command has been completed. In some embodiments, the release of the block may be in full or partial. For example, a block may be released on a portion of copy operations that have completed some progress of reading or writing.

Although operations 834-7, 834-8, and/or 834-9 may show the copy command progressing sequentially through SREs, in some embodiments, one or more read and/or write operations used to implement the copy command may be performed in parallel, for example, while still maintaining atomicity of the overall copy command or over each of the SREs as may be required depending on the implementation details.

Figure 9:
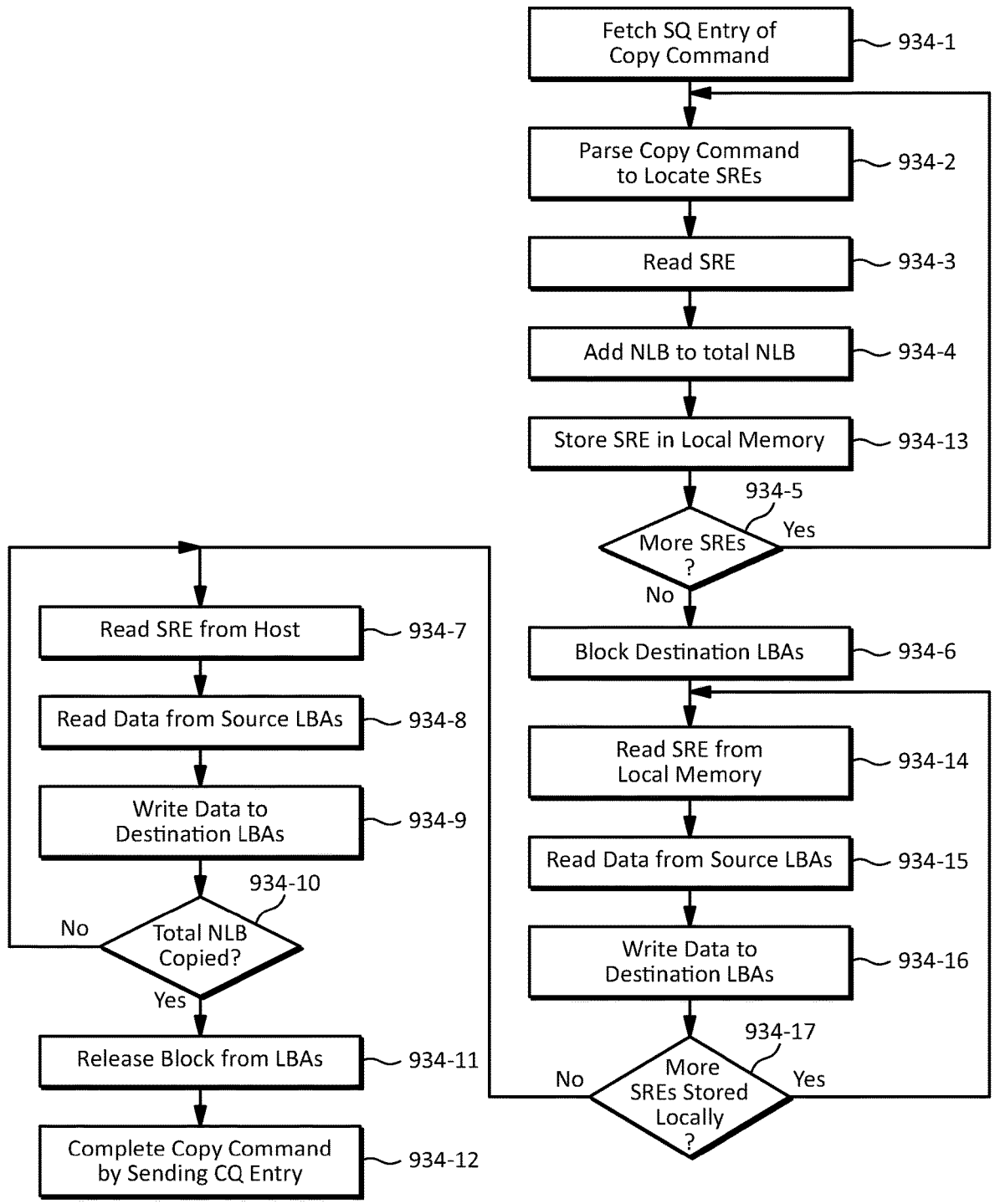
FIG. 9 illustrates another embodiment of a method for a copy operation with first and second reads of source range entries in accordance with example embodiments of the disclosure.

FIG. 9 illustrates another embodiment of a method for a copy operation with first and second reads of source range entries in accordance with example embodiments of the disclosure. In some aspects, the embodiment illustrated in FIG. 9 may be similar to the embodiment illustrated in FIG. 8, and elements in FIG. 9 that are similar to those in FIG. 8 may be indicated by reference numerals ending in the same digits. However, the embodiment illustrated in FIG. 9 may include an operation 934-13 in which the method may store one or more SREs, for example, the first few SREs read from a host, in local memory at the device. The embodiment illustrated in FIG. 9 may also include an operation 934-14 at which the method may retrieve an SRE (which may have been stored in local memory, e.g., at operation 934-13). At operation 934 15, the method may perform a read operation on source data indicated by the corresponding starting source LBA and NLB of the SRE which has been stored locally at the device at operation 934-13. At operation 934-16, the method may perform a write operation using the data read at operation 934-15 into one or more corresponding destination LBAs. Thus, the embodiment illustrated in FIG. 9 may begin processing SREs that are stored locally (e.g., without waiting to read the SREs from the host for a second time). In some embodiments, an atomic copy command may protect (e.g., implement a block) for one or more LBAs associated with data in a write buffer such that the block may be released before the data in the write buffer is transferred to (e.g., programmed into) the storage media. Thus, in some embodiments, a storage device controller may be in the process of programming write data from a buffer into storage media (e.g., after a storage device controller has sent a completion to a completion queue to indicate to a host that a copy command has been completed), but later references to that data may resolve to a buffer and/or storage media to protect atomicity.

At operation 934-17, the method may determine if any more SREs are stored locally at the device. If one or more locally stored SREs are still available the method may loop through operations 934-14, 934-15, 934-16, and/or 934-17 until no more locally stored SREs are available. The method may then proceed to operation 934-7 where it may begin to read SREs from a host for a second time.

Figure 10:
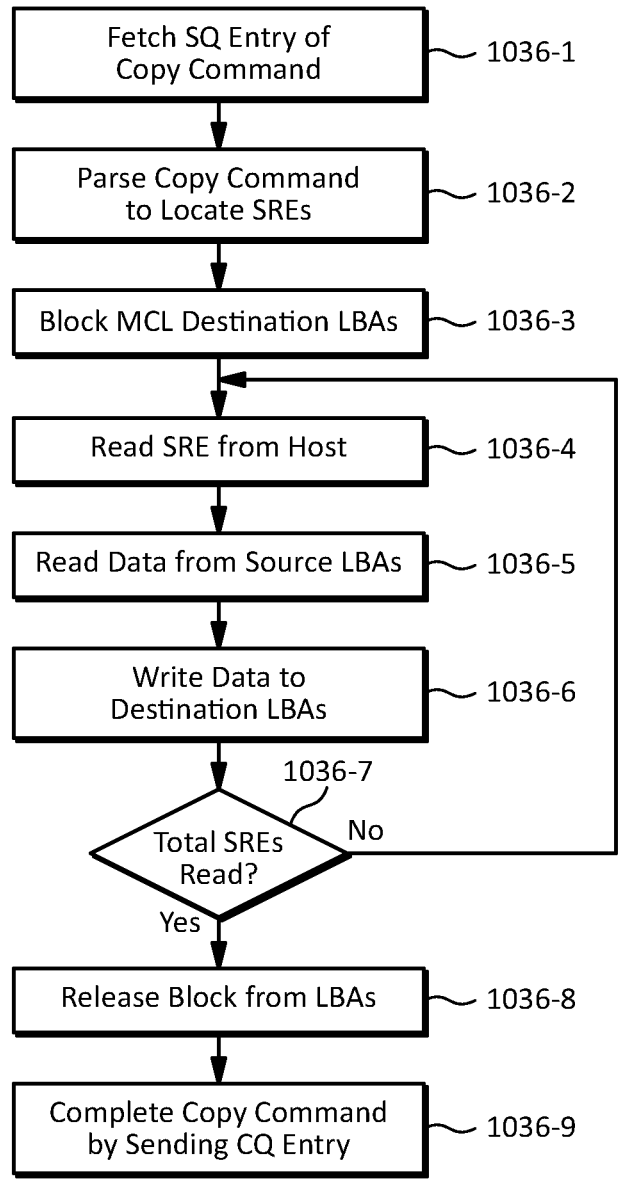
FIG. 10 illustrates an embodiment of a method for a copy operation with blocking of a predetermined amount of destination space in accordance with example embodiments of the disclosure.

FIG. 10 illustrates an embodiment of a method for a copy operation with blocking of a predetermined amount of destination space in accordance with example embodiments of the disclosure. For purposes of illustration, the embodiment illustrated in FIG. 10 may be described in the context of a device such as a storage device that may receive a copy command using a storage protocol such as NVMe, but the inventive principles are not limited to these example implementation details. For example, some embodiments may use SATA, SAS, and/or any other type of interface, protocol, and/or the like with any type of device.

Referring to FIG. 10, the method may begin at operation 1036-1 wherein a device may fetch a submission queue entry with a copy command. In some embodiments, the submission queue may reside at a host, at the device, or at any other location. At operation 1036-2, the method may parse the copy command (e.g., by checking the number of ranges (NR) as in Word 3 illustrated in FIG. 4) to locate one or more SREs, for example, as illustrated in FIG. 5, to locate an SDLBA field, and/or the like.

At operation 1036-3, the method may block at least a portion (e.g., all) of the destination LBAs, e.g., beginning at the SDLBA and continuing for an amount of space that may be adequate to block an anticipated total size of the copy command. For example, in some embodiments, the method may block a conservative number of LBAs determined by a maximum copy length (MCL) for a copy command or (maximum SRE NLB*maximum number of SREs) supported by the device. In some embodiments, and depending on the implementation details, these two values may not add up to the same number even though they may be logically similar. In some embodiments, the MCL may be determined by the expression Min{MCL, MSRC*MSRRL}.

Once some or all of the destination LBAs have been blocked, the method may begin reading one or more SREs to perform one or more read operations and/or one or more write operations to implement the copy command. For example, at operation 1036-4, the method may read an SRE (which in this example may be located at a host). At operation 1036-5, the method may perform a read operation on source data indicated by the corresponding starting source LBA and NLB of the SRE which has been read from the host. At operation 1036-6, the method may perform a write operation using the data read at operation 1036-5 into one or more corresponding destination LBAs.

At operation 1036-7, the method may determine if the total number of SREs indicated by the number of ranges (NR) have been read and their corresponding NLBs copied. If source data associated with one or more SREs remains to be read and/or written, the method may loop through operations 1036-4, 1036-5, 1036-6, and/or 1036-7 until the source data associated with the SREs has been read and written to the corresponding destination LBAs. In some embodiments, by blocking an amount of destination space based on an MCL or (maximum SRE NLB*maximum number of SREs), the method may be able to copy the entire data size of the copy command without performing any checks on the amount of data to be copied and/or the amount of data remaining to be copied. In some embodiments, this may implement a block on a relatively large LBA range, and while it may provide a correct result, it may hold up one or more reads to some or all of the entire LBA range that is protected. Therefore, one or more reads may be slowed down even though no copy activity may necessarily be happening for some of them.

At operation 1036-8, the method may release the block from some or all of the destination LBAs that may have been blocked in operation 1036-3. At operation 1036-9, the method complete the copy command, for example, by sending a completion queue entry to a host to indicate that the copy command has been completed. In some embodiments, the release of some or all of a blocked address range may be from the end as more addresses are read from the SRE, and/or the release of blocked LBA ranges may also be from the beginning or middle of the LBA range as a portion of the copy operations have progressed.

Although operations 1036-4, 1036-5, 1036-6, and/or 1036-7 may show the copy command progressing sequentially through SREs, in some embodiments, one or more read and/or write operations used to implement the copy command may be performed in parallel, for example, while still maintaining atomicity of the overall copy command.

Figure 11:
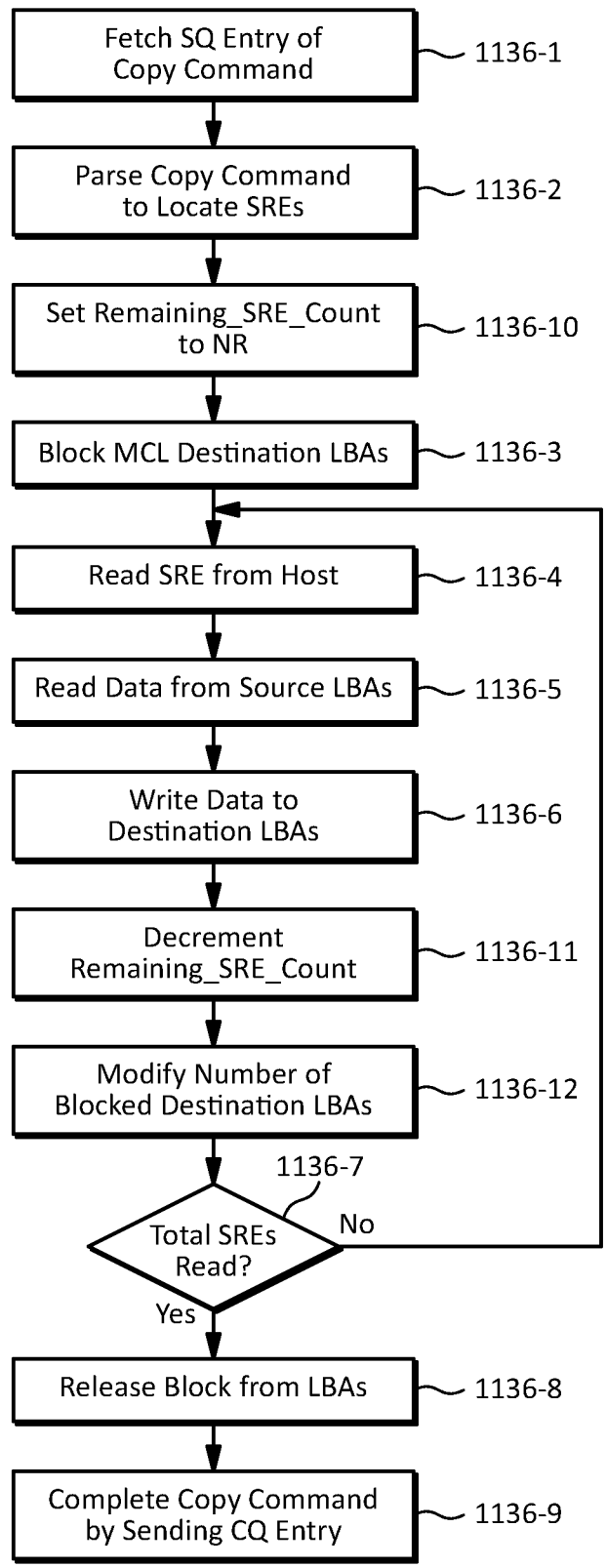
FIG. 11 illustrates another embodiment of a copy operation with blocking of a predetermined amount of destination space in accordance with example embodiments of the disclosure.

FIG. 11 illustrates another embodiment of a copy operation with blocking of a predetermined amount of destination space in accordance with example embodiments of the disclosure. In some aspects, the embodiment illustrated in FIG. 11 may be similar to the embodiment illustrated in FIG. 10, and elements in FIG. 11 that are similar to those in FIG. 10 may be indicated by reference numerals ending in the same digits. However, the embodiment illustrated in FIG. 11 may determine a different amount of destination space to block based on an amount of destination space already written. The embodiment illustrated in FIG. 11 may include an operation 1136-10 in which the method may set a counter (e.g., Remaining_SRE_Count) to NR. Each time through the loop, at operation 1136-11, the method may decrement the counter, and at operation 1136-12, the method may determine a different amount of destination space to block based on an amount of destination space already written. For example, in some embodiments, at operation 1136-12, the method may determine the amount of destination space to block as MCL-MSSRL*Remaining_SRE_Count, where MSSRL may indicate a Maximum Single Source Range Length supported by the device. In some embodiments, the amount of destination space to be blocked may be reduced, for example, because not every SRE may use the full MSSRL. In some embodiments, operations 1136-11 and/or 1136-12 may be performed before and/or in parallel with operations 1136-4 through 1136-6, or at any other time or in any other order.

As another example, in some embodiments in which the NR may not be known, the method may determine the amount of destination space to block as Max{MCL−(MSRRL*[MSRC−Remaining_SRE_Count]), Remaining_SRE_Count*MSRRL}, where MSRC may indicate a Maximum SRE Count.

Some embodiments may combine one or more techniques described herein to implement one or more hybrid techniques. In some embodiments, one or more parameters of a hybrid technique may be varied based on device behavior, memory constraints, current device activity, and/or the like.

For example, in some embodiments, a certain number of copy commands (e.g., the first copy commands submitted to an SQ) may use the method illustrated in FIG. 6 in which some or all of the SREs may be stored (for example, in device memory) while one or more additional copy commands may use the method illustrated in FIG. 8 in which no or fewer SREs may be stored (for example, in device memory). In some embodiments, and depending on the implementation details, such a hybrid technique may enable a device to handle a relatively large number of overlapping copy commands, while limiting the amount of local memory used to store SREs.

As another example, in some embodiments, a system, device, and/or the like, may generate an activity indicator (e.g., number of overlapping copy commands (e.g., in one or more SQs) to estimate an activity level of a host, a device, and/or the like. In some embodiments, if the activity indicator is below a threshold (e.g., is relatively idle), the method illustrated in FIG. 8 may be used to process copy commands. However, if the activity indicator is at or exceeds the threshold (e.g., is relatively busy), the method illustrated in FIG. 10 may be used to process copy commands, for example, because it may involve fewer reads and or calculations.

Figure 12:
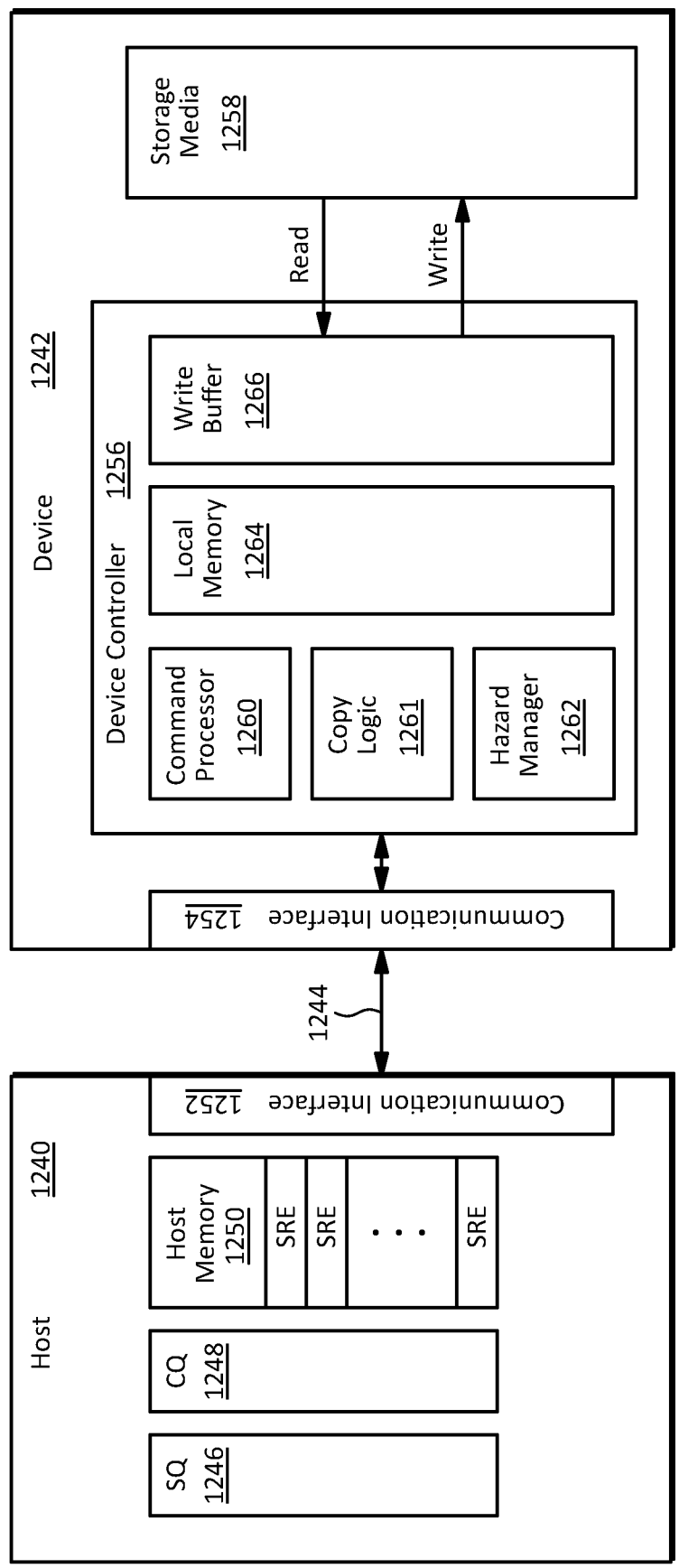
FIG. 12 illustrates an example embodiment of a system for implementing an atomically protected copy command in accordance with example embodiments of the disclosure.

FIG. 12 illustrates an example embodiment of a system for implementing an atomically protected copy command in accordance with example embodiments of the disclosure. The system illustrated in FIG. 12 may be used to implement, and/or may be implemented with, any of the embodiments of systems, devices, methods, techniques, and/or the like disclosed herein. The system illustrated in FIG. 12 may include a host 1240 and a device 1242 that may communicate through a communication connection 1244.

In some embodiments, the host 1240 may include a command submission queue (SQ) 1246, a completion queue (CQ) 1248, a host memory 1250, and/or a host communication interface 1252. The SQ 1246 may be implemented, for example, as an NVMe submission queue that may hold commands (e.g., copy commands) to be consumed by the device 1242. The completion queue 1248 may be implemented for example, as an NVMe completion queue that may hold, for example, completions that may be sent by the device 1242 to indicate the completion of commands (e.g. copy commands) by the device 1242. The host memory 1250 may use used, for example, to store command data such as SREs for copy commands that may be submitted by the host 1240 using the submission queue 1246.

In some embodiments, the device 1242 may include a device communication interface 1254, a device controller 1256, and/or a storage media 1258. In some embodiments, the device controller 1256 may include a command processor 1260 that may fetch and/or parse commands (e.g., copy commands) from the submission queue 1246. In some embodiments, the device controller 1256 may include copy logic 1261 that may implement one or more copy commands, including one or more read operations and/or write operations associated therewith, as described herein.

In some embodiments, the device controller 1256 may include a hazard manager 1262 that may be used, for example, to enforce atomicity of one or more copy commands. For example, in some embodiments, one or more (e.g., all) destination spaces (e.g., destination LBAs ranges) for one or more (e.g., all) write operations may be submitted by the copy logic to the hazard manager 1262 to ensure that any atomicity for the destination spaces is enforced. In some embodiments, upon completion of one or more (e.g., all) atomically protected write operations, the associated destination space (e.g., destination LBA range) may be cleared from the hazard manager to free up the space for use by other processes.

In some embodiments, the device controller 1256 may include a local memory 1264 that may be used, for example, to store one or more SREs for one or more copy commands that may be parsed by the command processor 1260 and executed by the copy logic 1261, and/or hazard manager 1262. In some embodiments, the device controller 1256 may include a write buffer that may be used, for example, to store source data read from one or more source LBAs in the storage media 1258 for it to be written to one or more destination LBAs in the storage media 1258. Upon completion of a copy command, the command processor 1260 may send a completion to the completion queue 1248.

In some embodiments, the host 1240 may be implemented with one or more of any type of apparatus such as a server such as a compute server, a storage server, a network server, a cloud server and/or the like, a computer such as a workstation, a personal computer, a tablet, a smart phone, and/or the like, or multiples and/or combinations thereof. In some embodiments, the device 1242 may be implemented with one or more of any type of device such as an accelerator device, a storage device, a network device (e.g., a network interface card (MC)), a memory expansion and/or buffer device, a graphics processing unit (CPU), a neural processing unit (NPU), a tensor processing unit (TPU), and/or the like, or multiples and/or combination thereof. In some embodiments, the host 1240 may also be implemented as a device. In some embodiments, either or both of the host 1240 and/or the device 1242 may be configured as a host, a client, and/or the like, or any combination thereof.

In some embodiments, the communication connection 1244 may be implemented with any type of wired and/or wireless communication medium, interface, protocol, and/or the like including Peripheral Component Interconnect Express (PCIe), Nonvolatile Memory Express (NVMe), NVMe over Fabric (NVMe-oF), Compute Express Link (CXL), and/or a coherent protocol such as CXL.mem, CXL.cache, CXL.IO and/or the like, Gen-Z, Open Coherent Accelerator Processor Interface (OpenCAPI), Cache Coherent Interconnect for Accelerators (CCIX), and/or the like, Advanced eXtensible Interface (AXI), Direct Memory Access (DMA), Remote DMA (RDMA), RDMA over Converged Ethernet (ROCE), Advanced Message Queuing Protocol (AMQP), Ethernet, Transmission Control Protocol/ Internet Protocol (TCP/IP), FibreChannel, InfiniBand, Serial ATA (SATA), Small Computer Systems Interface (SCSI), Serial Attached SCSI (SAS), iWARP, any generation of wireless network including 2G, 3G, 4G, 5G, and/or the like, any generation of Wi-Fi, Bluetooth, near-field communication (NFC), and/or the like, or any combination thereof. In some embodiments, the communication connection 1244 may include a communication fabric including one or more links, buses, switches, hubs, nodes, routers, translators, repeaters, and/or the like.

In an embodiment in which the device 1242 may be implemented at least partially as a storage device, the storage device may include any type of nonvolatile storage media based, for example, on solid state media (e.g., a solid state drive (SSD)), magnetic media (e.g., a hard disk drive (HDD)), optical media, and/or the like, or any combination thereof. For example, in some embodiments, a storage device may be implemented as an SSD based on not-AND (NAND) flash memory, persistent memory such as cross-gridded nonvolatile memory, memory with bulk resistance change, phase change memory (PCM), and/or the like, or any combination thereof. Any such storage device may be implemented in any form factor such as 3.5 inch, 2.5 inch, 1.8 inch, M.2, Enterprise and Data Center SSD Form Factor (EDSFF), NF1, and/or the like, using any connector configuration such as SATA, SCSI, SAS, U.2, M.2, and/or the like. Any such storage device may be implemented entirely or partially with, and/or used in connection with, a server chassis, server rack, dataroom, datacenter, edge datacenter, mobile edge datacenter, and/or any combinations thereof.

Any of the functionality described herein, including any of the host functionality, device functionally, and/or the like (e.g., the command processor 1260, copy logic 1261, hazard manager 1262, as well as any of the functionality described with respect to the embodiments illustrated in FIGS. 1-13) may be implemented with hardware, software, firmware, or any combination thereof including, for example, hardware and/or software combinational logic, sequential logic, timers, counters, registers, state machines, volatile memories such as dynamic random access memory (DRAM) and/or static random access memory (SRAM), nonvolatile memory including flash memory, persistent memory such as cross-gridded nonvolatile memory, memory with bulk resistance change, phase change memory (PCM), and/or the like and/or any combination thereof, complex programmable logic devices (CPLDs), field programmable gate arrays (FPGAs), application specific integrated circuits (ASICs) CPUs including complex instruction set computer (CISC) processors such as x86 processors and/or reduced instruction set computer (RISC) processors such as ARM processors), graphics processing units (GPUs), neural processing units (NPUs), tensor processing units (TPUs) and/or the like, executing instructions stored in any type of memory, in some embodiments, one or more components may be implemented as a system-on-chip (SOC).

Figure 13:
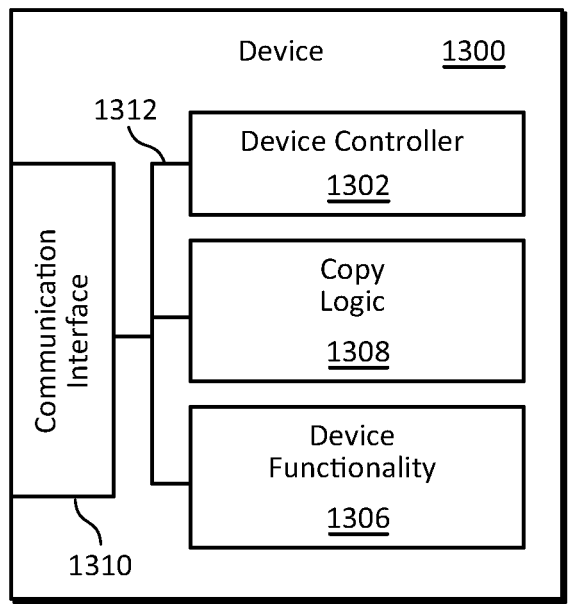
FIG. 13 illustrates an example embodiment of a device in accordance with example embodiments of the disclosure.

FIG. 13 illustrates an example embodiment of a device in accordance with example embodiments of the disclosure. The embodiment 1300 illustrated in FIG. 13 may be used, for example, to implement any of the devices disclosed herein. The device 1300 may include a device controller 1302, copy logic 1308, a device functionality circuit 1306, and/or a communication interface 1310. The components illustrated in FIG. 13 may communicate through one or more device buses 1312. The copy logic 1308 may be used, for example, to implement any of the copy command functionality disclosed herein.

The device functionality circuit 1306 may include any hardware to implement the primary function of the device 1300. For example, if the device 1300 is implemented as a storage device, the device functionality circuit 1306 may include a storage medium such as one or more flash memory devices, an FTL, and/or the like. As another example, if the device 1300 is implemented as a network interface card (MC), the device functionality circuit 1306 may include one or more modems, network interfaces, physical layers (PHYs), medium access control layers (MACS), and/or the like. As a further example, if the device 1300 is implemented as an accelerator, the device functionality circuit 1306 may include one or more accelerator circuits, memory circuits, and/or the like.

Figure 14:
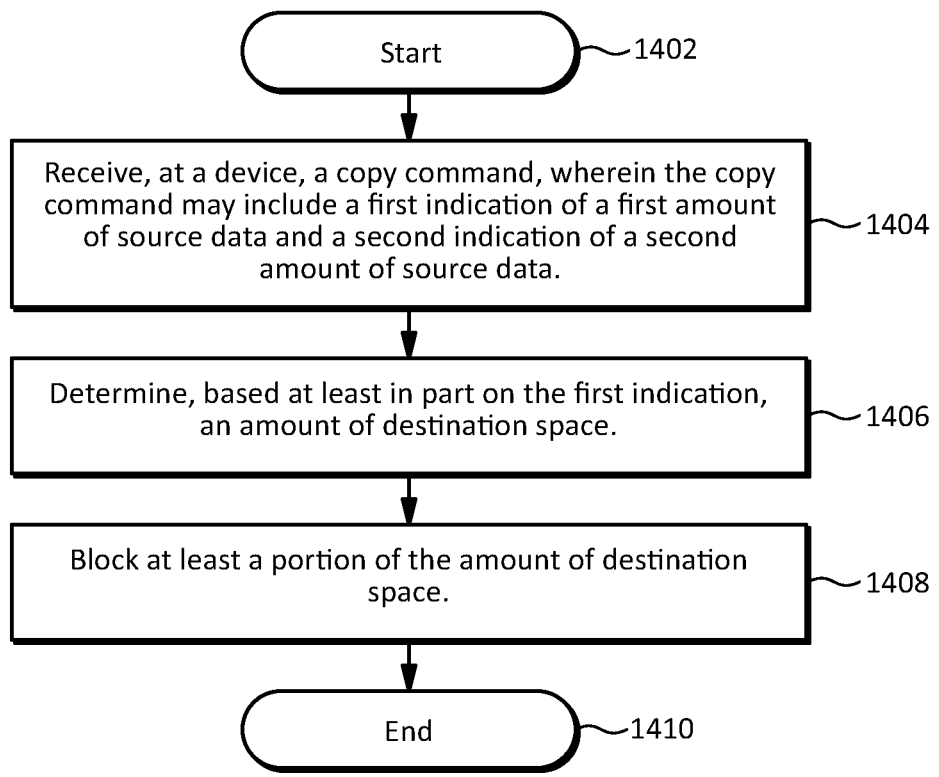
FIG. 14 illustrates an embodiment of a copy command in accordance embodiments of the disclosure.

FIG. 14 illustrates an embodiment of a method for communication in accordance with example embodiments of the disclosure. The method may begin at operation 1402. At operation 1404, the method may receive, at a device, a copy command, wherein the copy command may include a first indication of a first amount of source data and a second indication of a second amount of source data. At operation 1406, the method may determine, based at least in part on the first indication, an amount of destination space for a write operation. At operation 1408, the method may block, for at least a portion of the write operation, at least a portion of the amount of destination space. The method may end at operation 1410.

The embodiment illustrated in FIG. 14, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the elements they modify and may not indicate any spatial or temporal order unless apparent otherwise from context. In some embodiments, a reference to an element may refer to at least a portion of the element, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method comprising:
    receiving, at a device, a copy command, wherein the copy command indicates an association between a first copy operation and a second copy operation, the copy command comprising a first indication of a first amount of source data for the first copy operation and a second indication of a second amount of source data for the second copy operation;

reading the first indication to determine the first amount of source data;

reading the second indication to determine the second amount of source data;

determining, based at least in part on the first amount of source data and the second amount of source data, an amount of destination space;

blocking at least the amount of destination space;

re-reading the first indication to perform the first copy operation to the destination space; and re-reading the second indication to perform, based on the association, the second copy operation to the destination space.

2. The method of claim 1, wherein the amount of destination space comprises at least a first portion of the first amount and at least a second portion of the second amount.

3. The method of claim 2, wherein the blocking comprises blocking the at least the first portion of the first amount and the at least the second portion of the second amount.

4. The method of claim 1, further comprising storing the first indication to generate a stored first indication.

5. The method of claim 4, wherein the performing the first copy operation comprises:

reading the stored first indication; and writing, based on the reading the stored first indication, in the at least a portion of the amount of destination space, at least a portion of the first amount of source data.

6. The method of claim 5, wherein the stored first indication is stored in a first memory location, the method further comprising modifying, based on the writing the at least a portion of the first amount of data, the first memory location.

7. The method of claim 2, wherein the first copy operation comprises writing in the at least a portion of the amount of destination space, at least a portion of the first amount of source data.

8. The method of claim 7, further comprising:

storing the second indication to generate a stored second indication; and reading the stored second indication;

wherein the performing the second copy operation comprises writing, based on the reading the stored second indication, in the at least a portion of the amount of destination space, at least a portion of the second amount of source data.

9. The method of claim 1, wherein the amount of destination space is a first amount of destination space, the method further comprising blocking, based on the receiving the copy command, a second amount of destination space.

10. The method of claim 9, wherein the second amount of destination space is based on a copy length for the copy command.

11. The method of claim 9, wherein the determining the first amount of destination space comprises modifying the second amount of destination space based at least in part on the first indication.

12. The method of claim 9, wherein:

the copy command comprises a count of indications; and the determining the first amount of destination space is based on the count of indications.

13. The method of claim 1 wherein, the amount of destination space is a first amount of destination space, the method further comprising:

determining, based at least in part on the second indication, a second amount of destination space; and blocking, at least a portion of the second amount of destination space.

14. A system comprising:

a host configured to send a copy command, wherein the copy command indicates a first indication of a first amount of source data and a second indication of a second amount of source data; and device configured to:

receive the copy command;

read the first indication to determine the first amount of source data;

read the second indication to determine the second amount of source data;

determine, based at least in part on the first amount of source data and the second amount of source data, an amount of destination space;

block at least the amount of destination space;

re-read, from the host the first indication;

re-read the second indication; and perform a copy operation to the destination space based on re-reading the first indication and re-reading the second indication.

15. The system of claim 14, wherein the amount of destination space comprises at least a first portion of the first amount and at least a second portion of the second amount.

16. The system of claim 15, wherein the device is further configured to:

store, at the device, the first indication to generate a stored first indication;

perform a read operation of the stored first indication; and write, based on the read operation, in the at least a portion of the amount of destination space, at least a portion of the first amount of source data.

17. A device comprising:

a communication interface;

a storage medium; and a device controller configured to:

receive, using the communication interface, a copy command, wherein the copy command indicates a first indication of a first amount of source data in the storage medium and a second indication of a second amount of source data in the storage medium;

read the first indication to determine the first amount of source data;

read the second indication to determine the second amount of source data;

perform a determination, based at least in part on the first amount of source data and the second amount of source data, of an amount of destination space in the storage medium;

block at least the amount of destination space based on the first amount of source data and the second amount of source data;

re-read the first indication to perform a first copy operation to the destination space; and re-read the second indication to perform a second copy operation to the destination space.

18. The device of claim 17, wherein the device controller is configured to:

re-read the second indication using the communication interface;

wherein the amount of destination space comprises at least a first portion of the first amount and at least a second portion of the second amount.

19. The device of claim 18, wherein:
the device controller is configured to store the first indication to generate a stored first indication;
re-reading the first indication comprises reading the stored first indication; and
the first copy operation comprises writing, based on reading the stored first indication, at least a portion of the first amount of source data in the destination space.

20. The device of claim 18, wherein the device controller is configured to write, based on reading a stored second indication, at least a portion of the second amount of source data to the destination space.

* * * * *